March 25, 1969  J. D. BISHOP  3,435,324

DRIVEN INVERTER DEAD-TIME CIRCUIT

Filed Nov. 1, 1967

A - DRIVE SIGNAL INPUT VOLTAGE
B - DRIVE SIGNAL INPUT CURRENT
C - SHORTING PULSES
D - BLANKING SIGNAL
E - BASE DRIVE OF TRANSISTORS 12 & 13
F - BASE DRIVE OF TRANSISTORS 14 & 15
G - INVERTER OUTPUT

INVENTOR
J. D. BISHOP
BY R. B. Ardis
ATTORNEY

United States Patent Office 3,435,324
Patented Mar. 25, 1969

3,435,324
DRIVEN INVERTER DEAD-TIME CIRCUIT
John D. Bishop, Basking Ridge, N.J., assignor to Bell Telephone Laboratories, Incorporated, Berkeley Heights, N.J., a corporation of New York
Filed Nov. 1, 1967, Ser. No. 679,733
Int. Cl. H02m 7/44, 7/68
U.S. Cl. 321—45            6 Claims

ABSTRACT OF THE DISCLOSURE

In a driven inverter the square-wave drive signal is monitored to generate a shorting pulse whenever the drive current switches from one polarity to an opposite polarity. The shorting pulse, which is of very short duration in comparison to the duration of the square-wave drive signal, is applied to the switching transistor drive transformers to effectively short-out all drive signals during the duration of each of the shorting pulses, thereby generating a positive dead-time between the turnoff and turnon of consecutively conducting transistors. In order to prevent the generation of false dead-time pulses as a result of voltage polarity changes of the drive signal, the shorting pulse circuit is disabled during such voltage polarity changes.

Background of the invention

The invention relates generally to driven transistor inverters and, more specifically, to driven inverter drive circuits with constant current drive which prevent the simultaneous conduction of oppositely phased switching transistors.

In driven inverters which use at least two groups of transistors normally one group of transistors conducts while the other group of transistors is turned off. A momentary, undesirable condition, called switch-through, where both groups of transistors conduct simultaneously, may arise due to inherent component and circuit characteristics. Such a switch-through condition may cause excessive power loss or, in the worst case, may result in switching transistor failure. Inverters which operate at high switching frequencies are particularly subject to the detrimental effects of such switch-through conditions.

A primary object of the invention is to eliminate switch-through conditions in driven inverters.

Another object of the invention is to increase the efficiency of driven inverters.

Summary of the invention

To fulfill these objects of the invention a dead-time circuit is incorporated in the inverter to generate a shorting pulse which is applied to the individual drive circuits of the switching transistors to provide for a positive dead-time between the turnoff and turnon of consecutively conducting switching transistors.

More specifically, on one embodiment of the invention a bridge type driven transistor inverter utilizes a separate drive circuit for each one of the two transistor pairs which are connected in respectively opposite arms of the bridge circuit and which conduct together in phase. The drive circuits for the switching transistors, in turn, derive their square-wave drive signal from a common square-wave drive signal source. In order to prevent the simultaneous conduction of switching transistors in adjacent arms of the bridge, that is, to eliminate switch-through conditions, a shorting pulse is generated and is induced in the drive circuitry of the switching transistors to generate a positive dead-time between the turnoff and turnon of consecutively conducting switching transistors. The dead-time is obtained by monitoring the current of the square-wave drive signal and by generating a shorting pulse of predetermined duration each time the square-wave drive signal current reverses polarity. The resulting shorting pulse is then applied to auxiliary windings on the switching transistor drive transformers to effectively short out the drive signal during the time when consecutively conducting transistors change their conduction states. As a result, a positive, predetermined dead-time is generated which prevents the simultaneous conduction of switching transistors in adjacent arms of the bridge inverter.

Another feature of the invention prevents the generation of false dead-time pulses by inherent ringing currents which are produced as a result of the polarity changes of the drive voltage and which are out of phase with the current polarity changes. To prevent the occurrence of these false dead-time pulses, the voltage polarity changes of the drive signal are sensed to generate a dead-time circuit blanking signal which disables the dead-time circuit during the duration of the resulting ringing currents, thereby preventing the generation of false dead-time pulses.

Detailed description

Figure 1:
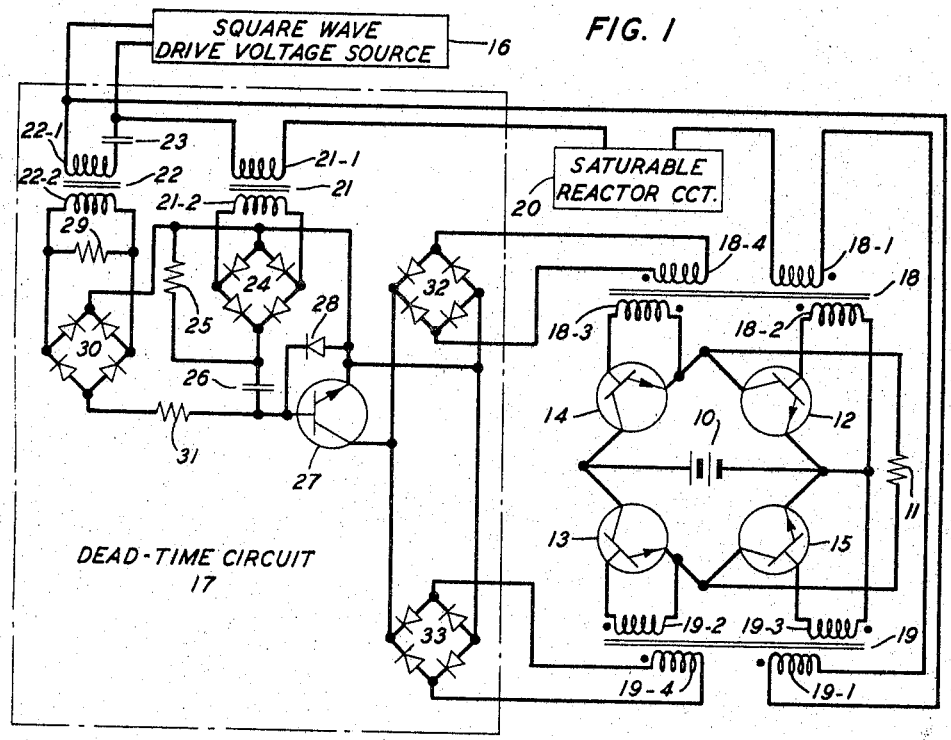
FIG. 1 is a schematic diagram of an embodiment of the invention in which a bridge type driven inverter incorporates a dead-time circuit.

In the bridge inverter illustrated in FIG. 1 of the drawing, the voltage obtained from D.C. source 10 is converted to a square-wave voltage to be supplied to load 11. The switching of the D.C. input takes place in a bridge circuit comprising n-p-n transistors 12 through 15. The bridge circuit is formed by connecting the emitter electrodes of transistors 12 and 15 together and by connecting the collector electrodes of transistors 13 and 14 together, while the emitter electrode of transistor 14 is connected to the collector electrode of transistor 12 and the emitter electrode of transistor 13 is connected to the collector electrode of transistor 15. Source 10 is connected across one diagonal of the bridge by having its negative terminal connected to the juncture of the emitter electrodes of transistors 12 and 15 and having its positive terminal connected to the juncture of the collector electrodes of transistors 13 and 14. Load 11 is connected across the other diagonal of the bridge which is formed by the juncture of the collector electrode and emitter electrode of transistors 12 and 14, respectively, and the juncture of the emitter electrode and collector electrode of transistors 13 and 15, respectively.

The basic drive signal for the inverter is derived from square-wave drive voltage source 16. Any one of a variety of square-wave sources which are well known in the art may be used as the square-wave drive voltage source 16 having an output waveform as illustrated in line A of FIG. 2, designated drive signal input voltage. One particular example of a square-wave drive voltage source which may be used in the embodiment of the invention is an astable multivibrator as described in Sections 11–14 of "Pulse, Digital, and Switching Waveforms," by J. Millman and H. Taub, published in 1965 by McGraw-Hill.

The output of source 16, in addition to being coupled to dead-time circuit 17, is connected to the series arrangement of primary windings 18–1 and 19–1 of drive transformers 18 and 19, respectively, to provide for the drive signal for transistors 12 through 15. A saturable-reactor circuit 20 is connected in series with the drive transformer primary windings in order to convert the output of square-wave drive voltage source 16 to a constant current signal. Saturable-reactor circuit 20 may take the form of any one of a variety of circuits well known in the art as described, for instance, in chapter 8 of "Magnetic Amplifiers," by H. F. Storm, published in 1955 by John Wiley and Sons.

Transistors 12 and 14 receive their respective drive signals from secondary windings 18–2 and 18–3, while transistors 13 and 15 receive their drive signals from secondary windings 19–2 and 19–3, respectively. The respective windings are connected between the base electrode and the emitter electrode of the corresponding transistor.

The windings of the several transformers of the inverter have been marked with dots to indicate the polarity relationship of the various drive signals as they are coupled through the transformers. Thus, an input signal of a certain polarity applied to the dot side of the primary winding of a particular transformer produces an output signal of the same polarity at the dot side of the secondary winding of the same transformer.

The output of square-wave drive voltage source 16 is coupled to dead-time circuit 17 through coupling transformers 21 and 22. The input to dead-time circuit 17 is obtained by connecting primary winding 21–1 of transformer 21 in series with saturable-reactor circuit 20 and drive transformer primary windings 18–1 and 19–1, while primary winding 22–1 of transformer 22 is connected directly across the output of square-wave drive voltage source 16 through capacitor 23.

The output of transformer 21, in turn, is coupled through secondary winding 21–2 across the input diagonal of bridge rectifier 24 which has its output diagonal connected across damping resistor 25. The juncture of one terminal of resistor 25 and the negative output terminal of the output diagonal of bridge rectifier 24 is connected to the emitter electrode of shorting transistor 27. The juncture of the other terminal of resistor 25 and the positive output terminal of the output diagonal of bridge rectifier 24, on the other hand, is connected through capacitor 26 to the base electrode of transistor 27. Diode 28 is connected across the input terminals of transistor 27 by having its cathode and anode connected to the base and emitter electrodes of transistor 27, respectively.

The output of transformer 22, on the other hand, is coupled through secondary winding 22–2 across the parallel combination of a resistor 29 and the input diagonal of bridge rectifier 30. The positive output terminal of the output diagonal of bridge rectifier 30, in turn, is connected to the emitter electrode of transistor 27, while the negative output terminal is coupled through resistor 31 to the base electrode of transistor 27.

The output of shorting transistor 27, in turn, is connected across two paralleled bridge rectifiers 32 and 33. That is, the collector and emitter electrodes of transistor 27 are connected across the parallel combination of one set of diagonals from each of the bridge rectifiers 32 and 33, while the other set of diagonals of each of the bridge rectifiers 32 and 33 is connected across auxiliary windings 18–4 and 19–4 of drive transformers 18 and 19, respectively, to couple the shorting pulses to the switching transistor drive transformers.

Figure 2:
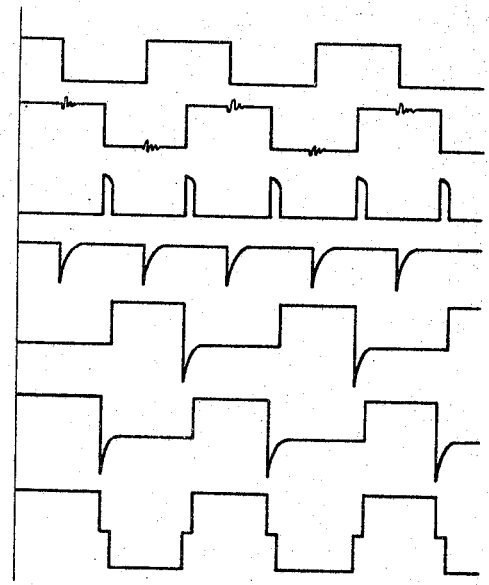
FIG. 2, in lines A through G, shows waveforms illustrating the operation of the embodiment of the invention of FIG. 1.

In the operation of the driven inverter, the square-wave drive signal obtained from source 16 through saturable reactor circuit 20 causes the pairs of transistors 12, 13 and 14, 15 to conduct alternately and in phase opposition to one another, thereby converting the direct current power supplied by source 10 to a square-wave voltage which is applied to load 11. The basic square-wave drive signal input current, as derived from square-wave drive voltage source 16 and shown in line A of FIG. 2, is applied through saturable-reactor circuit 20 to primary windings 18–1 and 19–1 of drive transformers 18 and 19, respectively, to control the conduction of switching transistors 12 to 15 through drive transformer secondary windings 18–2, 19–2, 18–3, and 19–3, respectively. Saturable-reactor circuit 20 converts the output of square-wave drive voltage source 16 to a constant current drive signal which has a waveshape and a typical phase relationship to the input voltage as illustrated in line B of FIG. 2.

During normal operating conditions transistor pairs 12, 13 and 14, 15 are alternately turned on together and are alternately turned off together, with only one pair of transistors conducting at any one time. Because of inherent delay and charge characteristics of the transistors, however, it may occur that one pair of transistors is not yet completely turned off before the other pair of transistors is turned on. This condition of simultaneous conduction by both pairs of transistors, called switch-through, is highly undesirable since it may cause excessive power losses or, in the worst case, may result in the failure of one or more of the switching transistors. In the operation of the circuit of the present invention, the creation of a switch-through condition is positively prevented by generating a specific and predetermined dead-time between the turnoff of one pair of switching transistors and the turnon of the other pair of switching transistors to assure the turnoff of the previously conducting pair of switching transistors before the subsequently conducting pair of switching transistors is turned on. This dead-time is obtained by applying a predetermined, definite shorting pulse during the drive signal switching interval to drive transformers 18 and 19 to short out the basic drive signal during the duration of the shorting pulse.

In the embodiment of the invention illustrated in FIG. 1 of the drawing, the required dead-time for the alternately conducting transistor pairs is generated in dead-time circuit 17. In the operation of dead-time circuit 17, primary winding 21–1 monitors the drive current which is applied to switching transistors 12 to 15. Whenever the drive current through primary winding 21–1 changes from one polarity to an opposite polarity, a voltage is induced in secondary winding 21–2. The induced voltage, as rectified by bridge rectifier 24, causes a current to flow through capacitor 26 into the base electrode of transistor 27, thereby forward biasing transistor 27. After the initial surge of current which has a rise time equal to the rise time of the square-wave drive current, the current begins to decrease at a rate which is determined primarily by the inductance of winding 21–2, the capacitance of capacitor 26, and the resistance of damping resistor 25.

When the amplitude of this current has decreased to approximately zero, bridge rectifier 24 becomes back-biased and the current ceases altogether. The current delivered to the base electrode of transistor 27, therefore, is a pulse which has a rise time equal to the rise time of the square-wave drive current for the switching transistors and which decays at a rate determined primarily by the circuit constants of transformer secondary winding 21–2, resistor 25, and capacitor 26. Line 2C of FIG. 2 depicts such a series of pulses initiated during respective polarity changes of the drive signal input current. Diode 28, which is connected between the base and emitter electrodes of transistor 27, allows capacitor 26 to be discharged between pulses to provide for the proper recovery of the circuit.

The amplitude of each of these shorting pulses is sufficient to saturate transistor 27. As a result, transistor 27 presents a short circuit from its collector electrode to its emitter electrode, that is, across its output terminals, during the duration of each one of the shorting pulses. This short circuit, in turn, is coupled through bridge rectifiers 32 and 33 to auxiliary windings 18–4 and 19–4, respectively, to impress the shorting pulse on the secondary windings of drive transformers 18 and 19. Consequently, drive transformer secondary windings 18-2, 18-3, 19-2, and 19-3 are effectively short-circuited during the duration of each of the shorting pulses, thereby shorting out the square-wave drive signal for the switching transistors during the duration of the shorting pulses.

All of the switching transistors have their drive signals disabled, therefore, during the duration of the shorting pulse and the square-wave drive signal is not applied to the subsequently conducting pairs of switching transistors until after the end of the shorting pulse. The duration of the shorting pulse, however, is of such specific, predetermined duration to short-out the drive signal for a long enough period to assure that all of the off-going transistors are able to recover, so that the previously conducting transistor pair is completely turned off before the subsequently conducting pair is turned on. As a result, a definite dead-time is generated between consecutively conducting transistor pairs of the bridge inverter, thereby preventing the occurrence of a switch-through condition. Lines E and F, and line G of FIG. 2 illustrate the base drive of the switching transistors and the resulting inverter output, respectively.

In the embodiment of the invention illustrated in FIG. 1 the square-wave drive signal current lags the drive voltage signal because of the inductive characteristics of the circuit that is being driven from source 16. Lines A and B of FIG. 2 show the relative phase relationship between the current and voltage of the square-wave drive signal. Because of this phase difference between the drive voltage and the resulting current, the polarity reversal of the drive voltage (line A, FIG. 2) takes place at a time between polarity reversals of the drive currents (line B, FIG. 2). These voltage polarity changes, in turn, distort the square-wave drive current and, as a result, produce ringing currents on the square-wave drive currents as shown on line B of FIG. 2.

Since any rapid changes in the drive current are sensed by primary winding 21-1, it is possible that these ringing currents may initiate shorting pulses in the dead-time circuit. A blanking signal is therefore generated to back-bias shorting transistor 27 during the duration of and for a period long enough to suppress the undesired effects of the ringing currents on the dead-time circuit, thereby preventing the occurrence of false shorting pulses.

Primary winding 22-1 senses the voltage polarity changes of the square-wave drive signal and induces a voltage across the secondary winding 22-2 each time the input voltage of the square-wave drive signal changes polarity. The voltage induced in secondary winding 22-2 is rectified through bridge rectifier 30 and then applied through current limiting resistor 31 across the base-emitter electrodes of transistor 27 in a reverse or back-biasing direction. Through the effects of capacitor 23 and resistor 29 the voltage in the secondary winding 22-2 is a differentiated version of the voltage from source 16, thereby producing a blanking signal as illustrated in line D, FIG. 2. That is, bridge rectifier 30 allows a negative pulse to be applied to the base-emitter electrodes of transistor 27 each time the square-wave drive signal voltage reverses polarity—that is, at each time when a new cycle of ringing currents is generated a blanking pulse is applied to the transistor, whereby transistor 27 is back-biased during the duration of the blanking pulse. As a result, any current changes which may have been sensed by transformer 21 are ineffective and cannot generate a shorting pul since transistor 27 is back-biased at that particular time. The duration of the blanking signal, which is primarily determined by the circuit constants of capacitor 23 and resistors 29 and 31, is of such predetermined duration to disable the shorting pulse circuit long enough to prevent the ringing currents from generating any false shorting pulses.

It is to be understood that the above-described arrangement is illustrative of the application of the principles of the invention. Numerous other arrangements may be devised by those skilled in the art without departing from the spirit and scope of the invention.

I claim:

1. In a driven inverter having at least two switching transistors conducting alternately and in phase opposition to one another in response to a square-wave drive signal applied to the primary winding of a switching transistor drive transformer having its secondary windings connected to the respective emitter-base circuits of said switching transistors to control the conduction of said transistors, a dead-time circuit comprising current sensing means responsive to said square-wave drive signal to generate an output whenever the current of said drive signal reverses polarity, pulse generating means connected to the output of said sensing means to generate shorting pulses of predetermined duration in response to said sensing means output, an auxiliary winding on said drive transformer inductively coupled to said drive transformer windings, and means to short circuit said auxiliary winding in response to each of said shorting pulses, whereby during the duration of said shorting pulses said square-wave drive signals which are applied to said drive transformers are effectively shorted out to provide for a definite dead-time between the turnoff and turnon of consecutively conducting transistors.

2. In a bridge type driven inverter having at least one switching transistor connected in each leg of said bridge, said transistors in opposite legs of said bridge conducting together alternately and in phase opposition to one another in response to a square-wave drive signal applied to to the primary windings of first and second switching transistor drive transformers, said first and second drive transformers having their secondary windings connected to the emitter-base circuits of switching transistors in respectively opposite legs of said bridge inverter to control the conduction of said respective switching transistors, a dead-time circuit comprising current sensing means responsive to said square-wave drive signal to generate an output whenever the current of said drive signal reverses polarity, pulse generating means connected to the output of said sensing means to generate shorting pulses of predetermined duration in response to said sensing means output, first and second auxiliary windings inductively coupled to the windings on said first and second drive transformers, respectively, and means to short circuit said auxiliary windings in response to said shorting pulses to short out during the duration of said shorting pulses said square-wave drive signals which are applied to said respective drive transformers, whereby a definite dead-time is provided for between the turnoff and turnon of consecutively conducting transistors in respectively opposite legs of said bridge inverter.

3. A driven inverter in accordane with claim 2 in which said current sensing means comprises a current sensing transformer having a primary winding connected in series with the source of said square-wave drive signal and the primary windings of said first and second drive transformers and having a secondary winding connected to said pulse generating means, said pulse generating means comprising a rectifier and a tuned circuit resonant at a frequency many times larger than the fundamental frequency of said square-wave drive signal, the secondary winding of said current sensing transformer being connected through said rectifier to said tuned circuit, and said tuned circuit being coupled to the output of said pulse generating means, whereby a change in polarity of said square-wave drive signal current generates pulses of predetermined polarity, the duration of which is many times shorter than the duration of said square-wave drive signal pulses.

4. A driven inverter in accordance with claim 3 in which said pulse generating means comprises first, second, third, and fourth diodes connected as a bridge rectifier, a resistor and capacitor, the secondary winding of said current sensing transformer being connected across the input diagonal of said bridge rectifier, said resistor being connected across the output diagonal of said bridge rectifier, and said capacitor having one terminal connected to one terminal of said resistor, said means to short circuit said transformer windings comprising a transistor having an emitter electrode, base electrode, and collector electrode, said base electrode being connected to the other terminal of said capacitor, said emitter electrode being connected to the other terminal of said resistor, and said collector electrode of said transistor being connected to said auxiliary winding of said first and second drive transformers, whereby said shorting pulses saturate said transistor to shorten out said drive signals during the duration of said shorting pulses.

5. A driven inverter in accordance with claim 4 which includes, in addition, voltage sensing means to generate an output whenever the voltage of said square-wave drive signal reverses polarity and a rectifier connected to said voltage sensing means to select an output of said voltage sensing means of predetermined polarity, the output of said rectifier being connected to said means to short circuit said transformer windings whenever said voltage sensing means generates an output, whereby said means to short circuit said transformer windings is disabled during voltage polarity reversals of said square-wave drive signal to prevent the generation of said shorting pulses in response to voltage polarity reversals of said square-wave drive signal.

6. A driven inverter in accordance with claim 5 in which said voltage sensing means comprises a transformer having primary and secondary windings, and first, second, third, and fourth diodes connected as bridge rectifier, said transformer primary winding being connected across the output of said square-wave drive signal source, and said secondary winding being connected across the input diagonal of said bridge rectifier, and the output of said bridge rectifier being connected across the input of said means to short circuit said transformer windings to disable said means to short circuit said transformer windings whenever said voltage sensing means generates an output.

References Cited

UNITED STATES PATENTS

| | | | |
|---|---|---|---|
| 2,809,303 | 10/1957 | Collins. | |
| 3,067,378 | 12/1962 | Paynter | 321—18 |
| 3,119,058 | 1/1964 | Genuit | 321—45 |
| 3,246,226 | 4/1966 | Geisler et al. | 321—2 |
| 3,260,963 | 7/1966 | Relation et al. | 331—113.1 |
| 3,315,146 | 4/1967 | Paice | 321—45 |
| 3,328,669 | 6/1967 | Ahmed et al. | 321—45 |

JOHN F. COUCH, *Primary Examiner.*

W. M. SHOOP, Jr., *Assistant Examiner.*

U.S. Cl. X.R.

307—240, 248; 331—113